Patented Oct. 15, 1929

1,731,969

UNITED STATES PATENT OFFICE

ABELARDO F. CAMPA, OF NEW YORK, N. Y., ASSIGNOR OF ONE-HALF TO ALBERT MEEHAN, OF NEW YORK, N. Y.

PROCESS OF WATERPROOFING PAPER AND THE LIKE

No Drawing.   Application filed April 16, 1926.   Serial No. 102,554.

My present invention relates to processes of moisture or water proofing and more especially relates to a process of making paper moisture or water proof and one object of the invention is to provide a process of making paper moisture or water proof and also pliable and bendable without cracking or breaking when folded or rolled.

Another object of the invention is to provide a process of making moisture or water proof paper adapted to be used for lining the interiors of cartons or containers and thereby rendering them moisture or water proof.

I attain these objects and such other objects as are kindred thereto by the process which consists in first saturating with a substantially non-drying, non-oxidizing liquid such as petroleum the material or paper to be waterproofed and pressing the excess of this liquid or petroleum out of the material or paper, passing one or more times as may be desirable the material or paper having a remainder of the substantially non-drying non-oxidizing liquid or petroleum therein through a waterproofing mixture such as the mixture of gumlac, and by gumlac is meant shellac, alcohol and water and then drying the material or paper, the purpose of first saturating the material or paper with said liquid or petroleum and then pressing the excess of this liquid or petroleum out of the material or paper being to prevent the material or paper when passed through the water proofing mixture from absorbing the mixture to such an extent as to render the material or paper brittle when dried.

I have found as a suitable water proofing mixture fifty (50) grams of gumlac, nine hundred and fifty (950) grams of alcohol and two (2) to eight (8) percent of distilled water. The paper first having been saturated with liquid peroleum and the excess thereof pressed therefrom, and having the petroleum remaining therein, being passed through the above mixture the requisite number of times and dried becomes proof against moisture or water and is not brittle but bendable and foldable for wrapping and the purposes for which water proof paper is generally used, and is also well adapted for lining the interiors of containers and the like for rendering them water proof.

I have also found that my process can be performed by first saturating the paper with petroleum and pressing the excess of petroleum out of the paper and then passing one or more times the paper having the petroleum remaining therein through a mixture of gumlac, glycerine, alcohol and distilled water and drying the paper, suitable proportions for this mixture being 100 grams of gumlac, 50 grams of glycerine, 800 grams of alcohol, and 50 grams of distilled water.

The term "gumlac," as used in the specification and claims, signifies the ordinary shellac of commerce.

What I claim and desire to protect by Letters Patent is:

1. The process of water proofing paper which consists in saturating the paper with liquid petroleum, pressing the excess of liquid petroleum out of the paper, passing one or more times the paper having the petroleum remainder therein through a mixture of one hundred grams of gumlac, eight hundred grams of alcohol, fifty grams of glycerine, and fifty percent of distilled water, and drying the paper.

2. The process of waterproofing paper which consists in saturating the paper with liquid petroleum, pressing the excess of liquid petroleum out of the paper, passing one or more times the paper having the petroleum therein through mixture of gumlac, glycerine, alcohol, and distilled water.

3. The process of waterproofing paper which consists in saturating the paper with petroleum, pressing the excess of petroleum out of the paper, passing the paper having the petroleum remainder therein through a mixture of gumlac, alcohol and water, and drying the paper.

4. A process of waterproofing material which consists in saturating the material with petroleum, removing the excess, and finally passing the material having petroleum therein through a gumlac waterproofing solution, said petroleum preventing excessive absorption by the material of the gumlac solution.

5. A process of waterproofing material which consists in saturating the material with a liquid hydrocarbon, removing the excess liquid from the material, then passing the material through a mixture containing gumlac, the liquid hydrocarbon in said material preventing excessive absorption by the material of said gumlac mixture, and finally drying the material.

6. A waterproofed paper provided with a coating of gumlac and glycerine and impregnated with petroleum.

Signed at New York, in the county of New York and State of New York, this 15th day of April, A. D. 1926.

ABELARDO F. CAMPA.